June 22, 1965  C. A. WILSON  3,190,555
SNAP-ACTING AND MODULATING VALVE
Filed Aug. 9, 1963
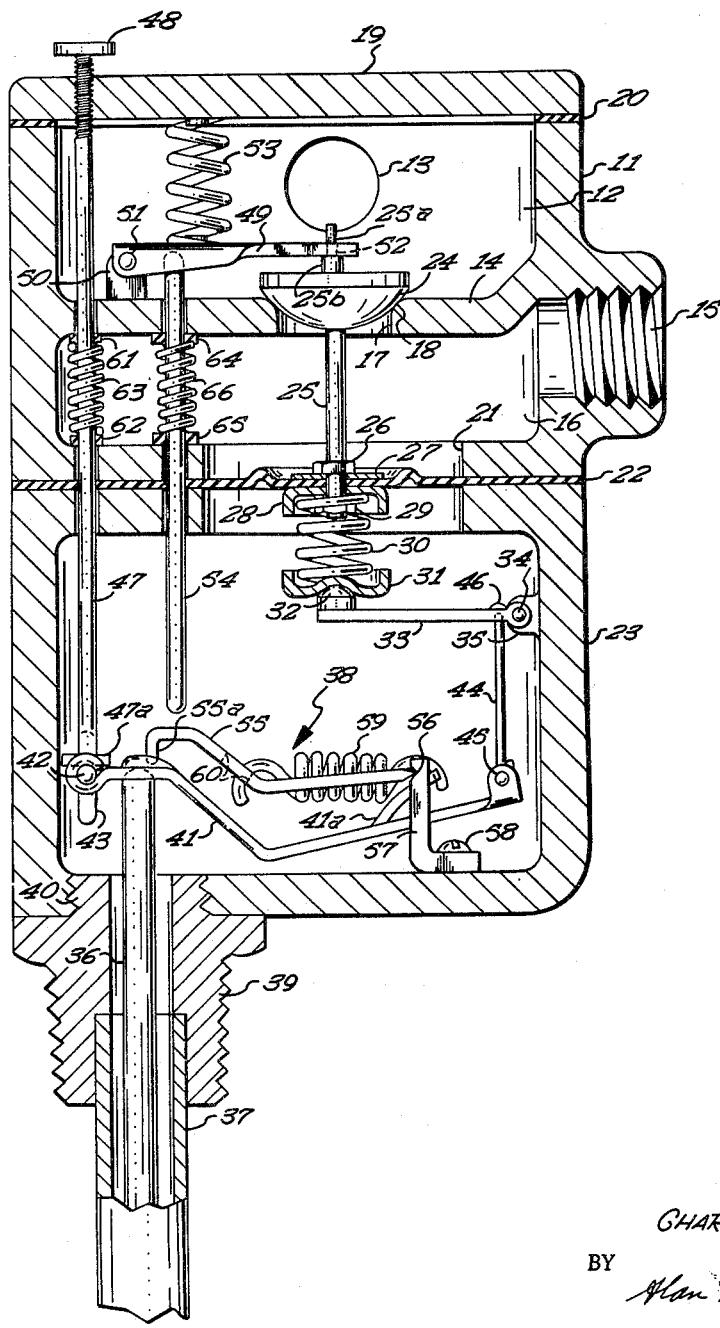
INVENTOR.
CHARLES A. WILSON
BY
Alan M. Staubly
ATTORNEY

United States Patent Office 3,190,555
Patented June 22, 1965

3,190,555
SNAP-ACTING AND MODULATING VALVE
Charles A. Wilson, Garden Grove, Calif., assignor to Honeywell Inc., a corporation of Delaware
Filed Aug. 9, 1963, Ser. No. 300,981
2 Claims. (Cl. 236—48)

This application relates to a fluid flow control valve and, more particularly, to a gas valve for thermostatically regulating the flow of gas to a gas burner in accordance with the heat demand.

While gas valves of the type mentioned to provide a control of the flow of gas to a burner in the same general manner are well known in the prior art, the industry has constantly been striving to provide more reliable, more compact and less expensive ones.

It is one of the objects of this invention to provide an improved valve design of the above-mentioned type.

Another object of the invention is to provide a pressure regulator gas valve which has means for snapping the valve from its closed position to a partially open position and thereafter variably position the valve by said means, through the pressure responsive portion thereof, so as to control the flow of gas to a burner in response to heat demand.

A further object of the invention is to provide a thermostatic gas valve wherein the temperature sensing means first operates a snap-acting mechanism to cause a control valve to move to a position permitting a pressure responsive means to hold the valve in a minimum flow position and thereafter, to variably load the pressure responsive means in accordance with heat demand.

Other objects of the invention will become apparent upon reading the following detailed description of the invention in conjunction with the accompanying drawing wherein:

The single figure of the drawing is a schematic showing of the arrangement of the valve components to provide a gas control valve which will function in the manner described above.

The valve body comprises a casting 11 with an inlet chamber 12, a threaded inlet 13, a partition wall 14 and a threaded outlet 15 communicating with an outlet chamber 16. An aperture 17 through the partition wall is rounded at 18 to provide a valve seat between the inlet and outlet. The open end of the chamber 12 is closed by means of a plate 19 suitably secured to the casting 11, with a sealing gasket 20 therebetween, by means of bolts (not shown). The casting 11 also has an aperture 21 in alignment with the aperture 17 and across which extends a diaphragm 22. The diaphragm is clamped at its marginal edges to the casting 11 by means of a housing 23 secured to the casting 11 by means of bolts (not shown) or other suitable means.

A valve 24 is positioned co-axial with the apertures 17 and 21 and is connected to the diaphragm by a valve stem 25 extending through the diaphragm. A nut 26 and clamping washer 27 are positioned on one side of the diaphragm while a spring retainer cup 28 and a nut 29 surround the valve stem on the other side of the diaphragm and sealingly clamps the diaphragm around the stem. A spring 30 is positioned between the retainer cup 28 and another spring retainer cup 31 pivotally mounted on a pivot member 32 at the free end of a lever 33.

The lever 33 is secured to the housing 23 by means of a pivot 34 extending through a boss 35 on the inner surface of the housing. The lever is adapted to be actuated by a temperature sensing unit comprising an Invar rod 36 and a copper tube 37, of conventional construction, which operates through a snap-acting mechanism generally designated by the reference numeral 38. The tube 37 is brazed into a threaded nipple 39 which, in turn, is threaded into a threaded opening 40 in the housing 23.

The snap-acting mechanism includes a portion of an actuator or lever 41 pivoted at one end on a pivot 42 slidably mounted in opposed slots 43 formed in side walls of the housing 23. The other end of the lever 41 is pivoted to a connecting link 44 by means of a pivot 45, with the other end of the link 44 bearing in an upwardly struck socket 46 formed in the lever 33 a short distance from the pivot 34. The position of pivot 42 is adapted to be varied by means of a manually adjustable rod 47 which extends through the adjoining walls of the housing 23 and casting 11, through partition wall 14 and through the cover 19. A threaded connection between the rod 47 and cover 19 makes it possible for a knob 48 on the outer end of rod 47 to rotate the rod to move it axially. A head 47a bears against the pivot 42 to hold the pivot in its adjusted position.

Additional means for controlling the operation of the valve 24 include a lever 49 which is connected to a boss 50, on the inlet chamber side of the partition wall 14, by means of a pivot 51. The other end of the lever 49 is apertured at 52 to receive a reduced diameter portion 25a of a valve stem extension 25b. A coil compression spring 53 extends between the cover 19 and an intermediate portion of the lever 49 to normally bias the valve 24 into seating engagement with the valve seat 18. The lever 49 is adapted to be moved away from the valve 24 to permit it to open under the bias of spring 30 by means of an actuating rod 54 extending from the lever 49 through apertures in the partition wall 14, casting 11, housing 23 and into a position slightly spaced from an end of a lever 55 of the snap-acting mechanism 38. One end of the lever 55 is pivoted at 56 on a bracket 57 while the other end of the lever 55 has a downwardly extending portion 55a that bears against lever 41 in one position of the lever 55. The bracket 57 is secured to the housing 23 by means of bolts 58. The lever 41 has an upwardly extending arm 41a that serves as a pivot for a tension spring 59 while an end of a slot 60, formed in the lever 55 intermediate its ends, serves as a pivot for the other end of the tension spring. The outer end or pivot of the arm 41a engages the adjacent hooked end of the spring 59 at a point to one side of the pivot point 56 of the bracket 57 in the closed position of the valve and is adapted to be moved to the other side of the axis of the lever 55 and to the other side of the pivot point 56, by movement of the lever 41 as it is actuated by the rod 36 upon contraction of the tube 37. This particular snap-acting mechanism per se is old in the art and is used to provide a snap movement of the rod 54 to compress the spring 53, when the lever 41 has moved the axis of spring 59 to the other side of the pivot 56, to cause the lever 55 to swing against the end of the rod 54 and to move the lever 49 away from the valve 24.

It is to be noted that as the lever 41 moves the spring 59 over center, the link 44 is moving the lever 33 in a direction to cause compression of the spring 30. Therefore, it is obvious that not only does the snap-acting mechanism overcome the loading of spring 53 to help cause the valve 24 to open but also the additional loading of the spring 30 aids in this opening movement.

Following the initial opening of the valve 24, due to the contraction and shortening of the length of the tube 37, any further contraction or shortening of the tube 37 will cause additional loading of the spring 30 so that the valve 24 will be opened to a greater extent and require a greater outlet pressure in the chamber 16 to cause the diaphragm to move in a valve closing direction, it being obvious that the diaphragm 22 is pressure responsive to vary the position of the valve 24 in accordance with the pressure in chamber 16.

In order to prevent leakage around the adjusting stem 47, packing washers 61 and 62 are positioned around the adjusting stem and spring biased against the opposing walls by means of a compression spring 63. Similarly, packing washers 64 and 65 are positioned around rod 54 and spring biased by compression spring 66 to prevent leakage through the apertures in which the rod is mounted.

*Operation*

As the operation of the valve is deemed to be apparent from the above description of the invention, it will suffice to state that the valve is shown in what is generally termed as a satisfied condition, that is, with the temperature sensing unit 36–37 in a position which is indicative of a desired temperature of the medium surrounding the sensor 36 and 37. Upon a drop in the temperature level of the medium surrounding the sensor 36–37, the tube 37 will shrink causing the rod 36 to move the lever 41 counterclockwise about the pivot 42. When the center of the spring or the pivot point of the spring of the snap-acting means moves across the axis of the lever 55 or the pivot point 56, the spring 59 will cause the lever 55 to swing in a clockwise direction about the pivot 56 and engage the adjacent end of the rod 54 and slide it through the apertures in the housing, casting and partition wall and pivot the lever 49 in a counterclockwise direction against the bias of spring 53. With the lever 49 moving away from the valve 24, the spring 30 will cause the valve 24 to follow this movement and move the valve 24 to a minimum flow position. This will permit a sufficient flow of gas through the valve to a burner to assure proper ignition thereof. The valve will then stay substantially in this minimum flow position regardless of variations in inlet pressure until either the rod 36 is moved an additional amount inwardly or toward the lever 41 to additionally load the spring 30, as a result of a further lowering of the temperature in the medium surrounding the sensor 36–37, or move in the opposite direction, as a result of the temperature of the medium rising.

From the above description, it is apparent that the applicant has created a very simple, compact and useful control valve that will provide the desirable performance characteristics needed for providing snap action between off and minimum flow positions and a modulation of gas to a burner between minimum flow and full on positions. The design requires a minimum of parts, and therefore, will provide an inexpensive and practical control valve. As it is deemed that modifications may be made therein without departing from the spirit of the invention, the scope of the invention should be determined from the scope of the appended claims.

I claim:

1. The combination comprising a valve body including an inlet, an outlet and an apertured wall therebetween; a valve seat at the aperture of said wall; a pressure regulator valve positioned in said body on the inlet side of said apertured wall and cooperable with said seat to control the flow of fluid therethrough; first means on the inlet side of said wall biasing said valve toward its closed position; second means on the outlet side of said wall biasing said valve toward its open position; pressure responsive means in said valve on the outlet side of said apertured wall and operably connected to said valve; condition responsive means on the outlet side of said wall and having an actuator for operating said valve; and separate motion transmitting means extending between said actuator and said first and second means, one of said separate motion transmitting means including snap-action means arranged to be actuated by said actuator upon initial movement thereof in a valve-opening direction to overpower said first means so as to free said valve to move to an open position under the bias of said second means, and the other of said separate motion transmitting means being arranged to variably load said second means to vary the pressure at which said valve will regulate.

2. The combination defined in claim 1 wherein said actuator is a lever having a pivoted end and two free end portions for respectively actuating said snap-action means and said other motion transmitting means.

References Cited by the Examiner

UNITED STATES PATENTS

| | | | |
|---|---|---|---|
| 1,180,638 | 4/16 | Fabian. | |
| 1,875,511 | 9/32 | Shivers | 236—48 |
| 1,908,765 | 5/33 | Kay | 236—48 |
| 2,212,285 | 8/40 | Ayers | 236—92 |
| 2,743,870 | 5/56 | Drow | 236—48 |
| 2,784,913 | 3/57 | Wasson | 236—92 |

EDWARD J. MICHAEL, *Primary Examiner.*

ALDEN D. STEWART, *Examiner.*